Jan. 5, 1971  R. E. NOVKOV  3,551,975
INSERT BIT FOR CUTOFF TOOLS HAVING ALIGNING MEANS
BETWEEN TIP AND SHANK
Filed March 28, 1968

INVENTOR.
RAYMOND E. NOVKOV
BY Freeman & Taylor
ATTORNEYS

United States Patent Office 3,551,975
Patented Jan. 5, 1971

3,551,975
INSERT BIT FOR CUTOFF TOOLS HAVING ALIGNING MEANS BETWEEN TIP AND SHANK
Raymond E. Novkov, Cuyahoga Falls, Ohio, assignor to The Warner & Swasey Company, Cleveland, Ohio
Filed Mar. 28, 1968, Ser. No. 716,817
Int. Cl. B26d 1/00
U.S. Cl. 29—95     3 Claims

ABSTRACT OF THE DISCLOSURE

An improved insert bit for use with metal cutoff tools and characterized by the presence of aligning means operable between the shank and tip portions of the bit with such alignment means including complemental interlocking surfaces on the tip and shank of the insert serving to properly locate the tip on the shank and further serving to increase the rigidity of the insert

RELATED APPLICATIONS

Except for concurrently filed applications entitled "Improved Cutoff or Grooving Tool and Holder Therefor" and "Throwaway Type Insert" and the insert shown and claimed in Novkov U.S. Pat. 2,964,833, there are no related applications.

BACKGROUND OF THE INVENTION

The present invention relates to the art of metal cutoff and the improvement relates to an improvement of the consumable insert bit or cutting element employed in cutoff tooling of the type shown in Novkov U.S. Pat. 2,964,833. In particular, the invention relates to two piece inserts in which a tip and shank are brazed or otherwise secured together. The insert is then seated on a support blade and held in a tool holder of the type shown in the just mentioned Novkov patent.

DESCRIPTION OF THE PRIOR ART

Except for the related applications referred to above, no other pertinent art is known to applicant.

SUMMARY OF THE INVENTION

While the consumable insert of the aforementioned patent has constituted a major advance in the art of metal cutoff as evidenced by the commercial success that the same has enjoyed, it has been discovered that the same can be improved by precasting certain components thereof so as to eliminate errors of assembly that result in transverse misalignment of the tip and shank during assembly. Such errors have the effect of creating a dynamic imbalance in the insert bit with such dynamic imbalance decreasing the efficiency of cutoff and leading to premature destruction of the tool by the tremendous pressures encountered during cutting.

It has been found that such errors of misalignment can, for all practical purposes, be eliminated by employing alignment means that serve to insure perfect alignment between tip and shank in all instances of assembly.

An added advantage of such construction is the provision of an increased amount of surface area for brazing purposes with the result that added rigidity is created in the bond that exists between tip and shank.

Production of an improved insert having the aforementioned characteristics accordingly becomes the principal object of this invention with other objects thereof becoming more apparent upon a reading of the following brief specification, considered and interpreted in view of the accompanying drawings.

Figure 1:
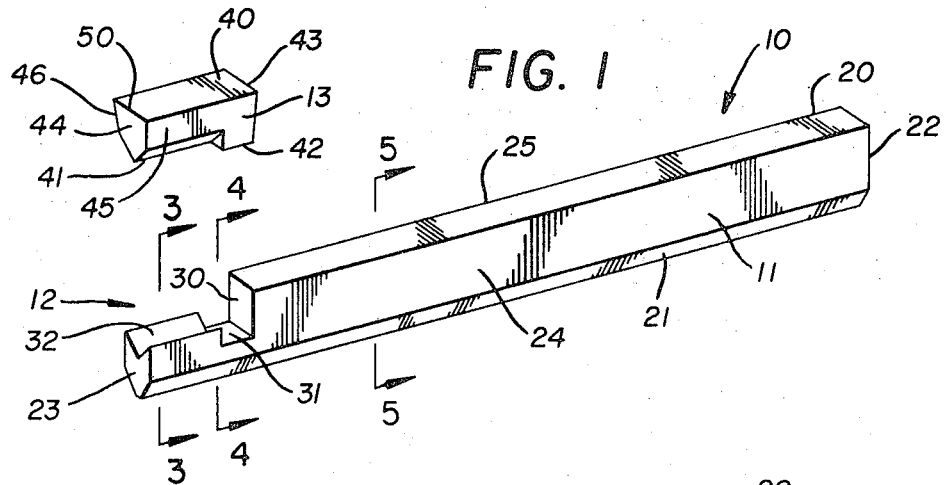
Figure 2:
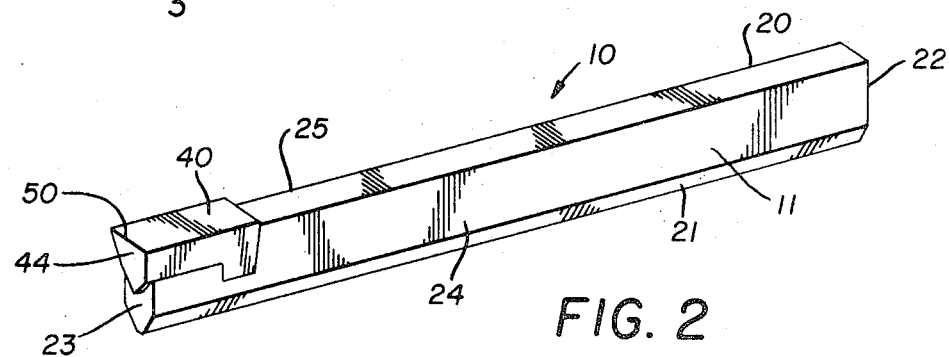
Figures 3, 4:
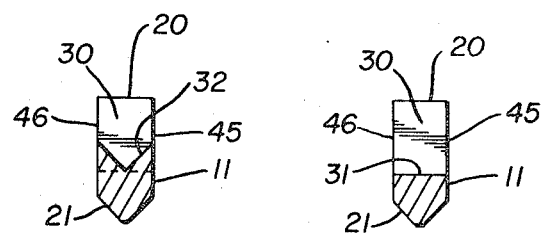
Figure 5:
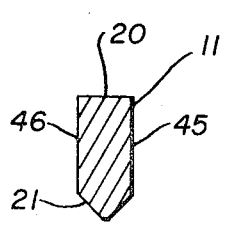

Of the drawings:
FIG. 1 is an exploded perspective view of the improved insert bit.
FIG. 2 is a perspective view showing the insert bit in assembled condition.
FIGS. 3, 4, and 5 are sectional views taken on the lines 3—3, 4—4, and 5—5 of FIG. 2.

DESCRIPTION OF THE PREFERRED EMBODIMENT

Referring now to the drawings and in particular to FIG. 1 thereof, the improved insert, generally designated by the numeral 10 includes an elongate pencil-like shank member 11 having a pocket 12 within which a cutting tip 13 may be inserted and retained in place by suitable means such as brazing.

The shank 11 includes a planar top surface 20 and a V-shaped bottom surface 21 with the preferred arrangement being such that the top surface 20 is perpendicular to a plane passing midway between the inclined surfaces of the V-shaped bottom 21.

Preferably, the length of the shank 11 is a substantial multiple of the height thereof with the shank having a rear wall 22 and a forward edge 23 as well as opposed side walls 24 and 25.

The pocket 12 includes a preferably vertical wall 30 that extends downwardly until meeting a preferably horizontal wall 31 that extends forwardly from the wall 30 in substantial parallelism with the top surface 20 as best shown in FIG. 1. A V-shaped groove 32 extends rearwardly from front edge 23 until the same opens into the void created by the undercut formed by walls 30 and 31 as shown in FIG. 1 of the drawings.

The tip 13 includes a top surface 40 and a bottom surface defined by a V-shaped projection 41 extending rearwardly of front wall 44 and a flat planar surface 42 that is preferably parallel to the top surface 40 and lies below V-shaped projection 41. By this arrangement, the projection 41 is received in the complemental V-shaped groove 32 of shank 11 while the planar surface 42 may rest on the horizontal surface 31. Further, the rear wall 43 of the insert 40 will abut the wall 30 of the pocket 12 in coplanar relationship when the insert is assembled as shown in FIG. 2. Finally, the front wall 44 of the insert 13 projects beyond the front edge 23 of the shank 11 as clearly shown in FIG. 2.

The usual back, side, and front clearance angles are either precast into the front surface 44, the top surface 40, and the opposed side surfaces 45 and 46 so as to provide front, side, and back clearance angles with respect to a cutting edge 50 or can be ground onto the tip.

In use or operation of the improved insert bit, it will first be assumed that the component parts have been machined and/or cast to the configuration shown in FIG. 1 and at this time, the mating surfaces of the tip 13 and shank 11 need merely be coated with the appropriate flux and then assembled with such assembly resulting in automatic alignment of the tip and shank because of (1) the interfitting of the V-shaped projection 41 and V-shaped groove 32 to assure proper transverse alignment and (2) the fitting of the offset rib defined by surfaces 43 and 42 into the void created by walls 30 and 31 of shank 11, with this last interfitting assuring proper longitudinal alignment between tip and shank.

It is believed apparent that, if desired, the surface 30 could also be slightly inclined to insure an accurate fit.

At this time, the brazing operation may be conducted following which a completedy finished insert bit will have been provided. With reference to the relationship between the top surfaces 20 and 40 of shank 11 and tip 13 respectively, it is not mandatory that these surfaces be in co-planar relationship with this being a matter of choice depending upon the particular application involved. For example, in the form of the invention shown, the tip 13 projects above the top surface 20 of shank 11.

While a full and complete description of the invention has been set forth in accordance with the dictates of the patent statutes, it is to be understood that the invention is not intended to be limited to the specific embodiment herein shown. Accordingly, modifications of the invention may be resorted to without departing from the spirit hereof or the scope of the appended claims.

What is claimed is:

1. An insert bit for cutoff tools of the character described, comprising;
   (A) an elongate shank having
      (1) top, bottom and opposed side walls and a forward edge
      (2) a pocket located in the area of juncture between said forward edge and said top and said opposed walls, said pocket including a first guide surface and a second guide surface located independently of said first guide surface; and
   (B) a cutting tip adapted to be received in said pocket and
      (1) having a bottom surface that is complemental in contour to the bottom surface of said pocket whereby said tip may be seated therein; and
   (C) said first guide surface locating said tip in proper transverse alignment with said shank; said second guide surface independently and said tip in proper longitudinal relationship with respect to said shank.

2. The insert of claim 1 further characterized by the fact that said first guide surface of said pocket is V-shaped in profile with the apex of said V being equidistant from said opposed side walls.

3. The device of claim 1 further characterized by the fact that said second guide surface of said pocket is one component of a transverse rib and groove connection between said pocket and said tip.

References Cited

UNITED STATES PATENTS

| | | | |
|---|---|---|---|
| 1,629,667 | 5/1927 | Knipple | 29—96 |
| 1,865,148 | 6/1932 | Slade | 29—95X |
| 1,974,215 | 9/1934 | Kilmer | 29—95 |
| 2,737,705 | 3/1956 | Novkov | 29—96 |
| 3,254,392 | 6/1966 | Novkov | 29—95 |

FOREIGN PATENTS

| | | | |
|---|---|---|---|
| 568,876 | 4/1945 | Great Britain | 29—96 |

HARRISON L. HINSON, Primary Examiner

U.S. Cl. X.R.

29—96